April 6, 1954     A. M. KIRK     2,674,095
HYDRAULIC BRAKE SYSTEM FLUID RESTORING VALVE
Filed July 27, 1950     2 Sheets-Sheet 1
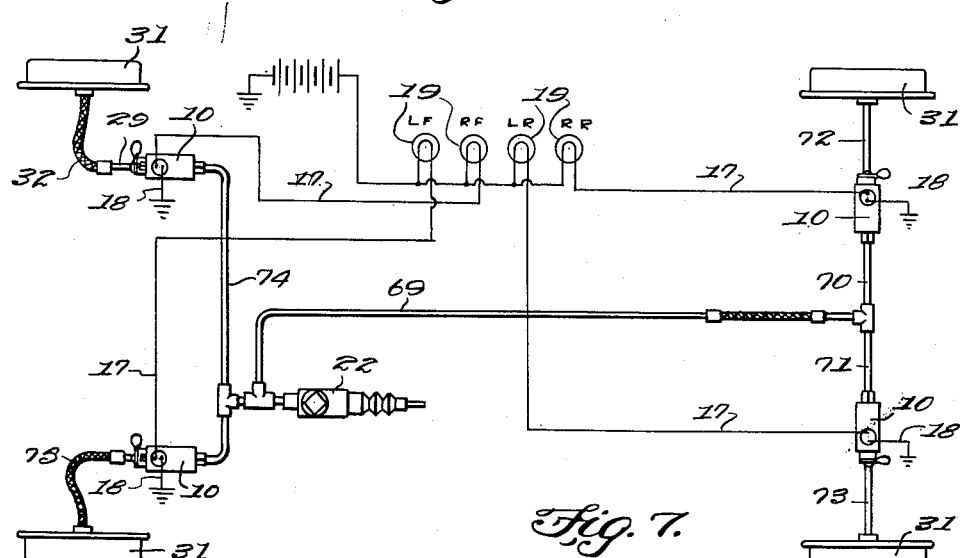
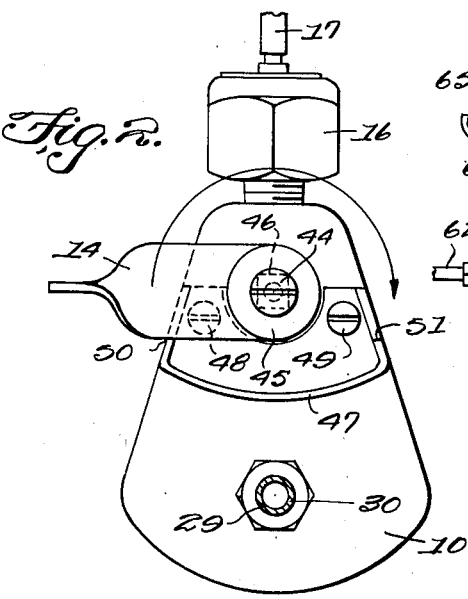
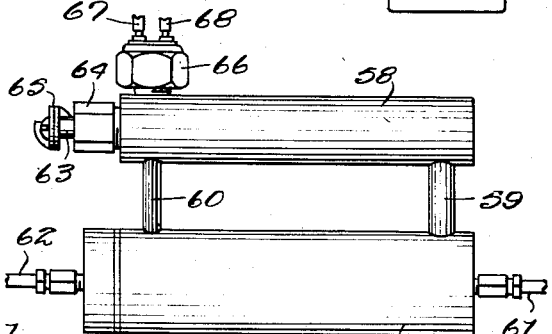
INVENTOR.
Alva M. Kirk,
BY Victor J. Evans & Co.
ATTORNEYS April 6, 1954  A. M. KIRK  2,674,095
HYDRAULIC BRAKE SYSTEM FLUID RESTORING VALVE
Filed July 27, 1950  2 Sheets-Sheet 2
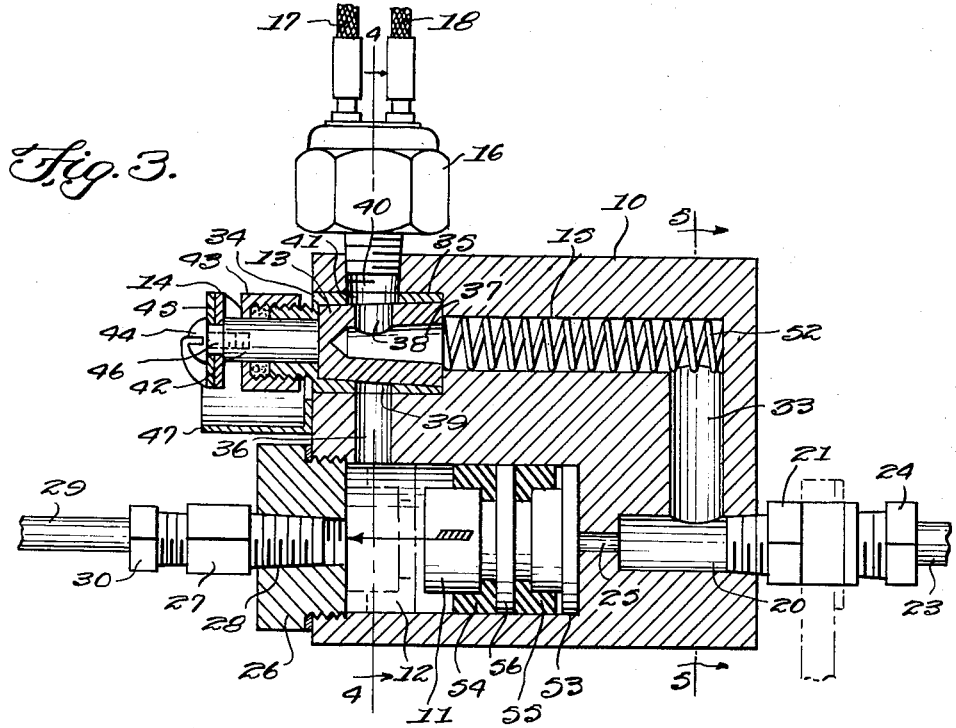
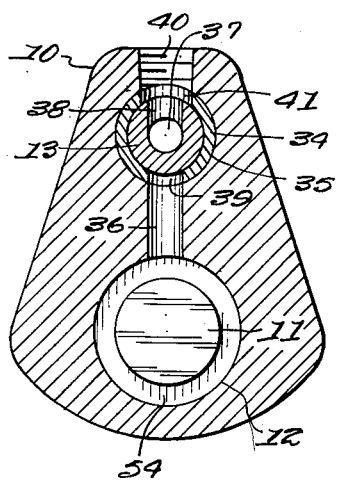
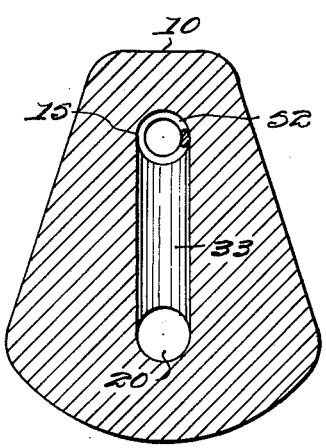
INVENTOR.
Alva M. Kirk,
BY Victor J. Evans & Co.
ATTORNEYS Patented Apr. 6, 1954

2,674,095

UNITED STATES PATENT OFFICE 2,674,095

HYDRAULIC BRAKE SYSTEM FLUID RESTORING VALVE

Alva M. Kirk, Yazoo City, Miss., assignor, by direct and mesne assignments, of four per cent to John S. Holmes, twenty-one per cent to Harris Bunch, twenty-one per cent to Durwood Teaster, and three per cent to Prentiss Terrell Russell, all of Yazoo City, Miss., and three per cent to J. J. Erickson Application July 27, 1950, Serial No. 176,203

2 Claims. (Cl. 60—54.5)

1

This invention relates to safety devices particularly adapted for hydraulic pressure systems such as brake systems, and in particular a device for sealing a line in which a leak or break develops to prevent loss of fluid from other parts of the system and also for restoring fluid for refilling a line such as a brake line with brake fluid when a leak develops in the line and particularly after repairing a line.

The purpose of this invention is to provide a safety valve body having a piston in a connection between a master brake fluid cylinder and a brake line with a by-pass having a manually actuated valve therein around the piston whereby brake fluid in the brake lines may be replenished with fluid from the master cylinder by actuating the valve in combination with the foot pedal of the brake and wherein the piston seals a line in which a leak develops so that other units in the system will continue to operate.

In the conventional fluid brake line, grit, scale, and the like work into the gasket or washers and leaks develop causing the loss of at least part of the brake fluid. Continued operation of the brake system with even a small leak in one of the brakes thereof results in the loss of sufficient brake fluid of the system to prevent operation of the brakes.

With this thought in mind this invention contemplates an instrument including a valve body with a direct passage from the master cylinder to a brake line extended therethrough in which the passage is provided with a piston and in which a by-pass with a manually actuated valve therein and also with a pilot light connection extended therefrom is connected around the piston.

The object of this invention is, therefore, to provide a fluid pressure instrument whereby fluid from a master cylinder or supply tank is fed into an operating line through a by-pass and wherein upon failure of a line the connection thereto is sealed.

Another object of the invention is to provide a safety device for fluid pressure lines such as brake systems wherein repaired lines to a brake, machine, or the like may readily be replenished with fluid.

Another object of the invention is to provide a safety device for fluid pressure lines that may be installed in equipment, and in particular in motor vehicles, now in use.

A further object of the invention is to provide a safety device for preventing accidental draining of fluid pressure systems and through which fluid in units of the system may be restored, which is of a comparatively simple and economical construction.

With these and other objects and advantages in view the invention embodies a valve body adapted to be installed in a fluid pressure system such as the brake system having a piston positioned in a direct passage from a master cylinder to a brake line and with a by-pass having a manually actuated valve therein extended therethrough and connecting the lines from the master cylinder to the brake line around the piston.

Other features and advantages of the invention will appear from the following description taken in connection with the drawings wherein:

Figure 1 is a diagrammatic view illustrating the positions of safety devices of this invention in a brake system of a motor vehicle.

Figure 2 is an end elevational view of the instrument looking toward the manually actuated lever.

Figure 3 is a longitudinal section through the instrument showing the parts in the operative positions and with the manually operated valve closed.

Figure 4 is a cross section taken on line 4—4 of Figure 3 also showing the manually actuated valve closed and the pilot light connection omitted.

Figure 5 is a similar section taken on line 5—5 of Figure 3.

Figure 6 is a detail showing a section also taken on line 4—4 of Figure 3 and showing the manually actuated valve in the open position.

Figure 7 is a side elevational view illustrating a modification wherein the device is provided for pressure lines of hydraulically actuated machines.

Referring now to the drawings wherein like reference characters denote corresponding parts the safety device of this invention includes an instrument having a valve body 10, a piston 11 in a cylinder or chamber 12, a valve 13 having a manually actuating lever 14 positioned in a by-pass 15 and a pressure responsive plug 16 connected by wires 17 and 18 to a pilot light or signal 19.

The body 10 is provided with a connection 20 into which a plug 21, connected to a master cylinder 22 by a tube 23 is threaded and the tube 23 is connected to the plug 21 by a bushing 24.

The connection 20 is connected to the cylinder 12 through a restricted opening 25 and the opposite end of the cylinder is closed by a nut 26 having a plug 27 in a threaded opening 28 therein. A tube 29 is secured in the plug 27 by a bushing 30 and the tube provides means for connecting the instrument to a part of equipment or to a brake of a wheel, as indicated by the numeral 31, shown in Figure 1, the tube 29 being connected to the brake system of the wheel by a flexible hose 32.

With the parts arranged as illustrated in Figure 3 the connection 20 is connected to the by-pass 15 through a passage or conduit 33 and a valve casing 34 in a valve chamber or recess 35 at the opposite end of the body is connected to the cylinder 12 through a passage 36.

The valve 13 which is rotatably mounted in the casing 34 is provided with a centrally disposed opening or bore 37 and a port 38 extends from the opening 37 to provide communicating means with the passage 36 through an opening 39 in the casing 34 and also to an opening 40 through an opening 41 in the casing.

The valve 13 is provided with a stem 42 that extends through a packing gland 43 threaded on the outer end of the casing 34 and the lever 14 is secured on the outer end of the stem by a screw 44 with a washer 45 between the head of the screw and lever. The lever is provided with a square hole that is positioned over a square stud 46 on the end of the valve stem. A drip pan 47, positioned below the packing gland 43 is attached to the end of the body 10 by screws 48 and 49 and the ends of the pan 47 are provided with stops 50 and 51 to limit the movement of the lever 14.

A spring 52 is provided in the by-pass 15 for resiliently urging the valve 13 against the conical seat in the valve casing 34, as shown in Figure 3.

The piston 11 is provided with a head 53 that engages the inner end of the cylinder 12, as shown in Figure 3 and packing rings 54 and 55 are provided on opposite sides of an annular intermediate flange 56. The piston floats in the cylinder 12 and as pressure is applied by pressing the foot brake lever the pressure forces the piston against the inner end of the cylinder, as shown in Figure 3. Upon release of the foot brake lever the piston is free to slide in the cylinder and should a leak develop in the line extended from the tube 29 whereby the pressure in the line is relieved pressure of the fluid in the master cylinder drives the piston hard against the inner end of the nut 26 whereby the passage through the line 29 is sealed so that fluid of the system is not drained through this line and the lines to the other brakes or units may continue to operate.

In the modification illustrated in Figure 7 the instrument, instead of being formed of a solid casting, is formed of a lower cylinder 57 in which the piston is provided and an upper cylinder 58, one end of which is connected to the cylinder 57 by a connection 59 similar to the passage 33, and the other end of which is connected to the cylinder 57 by a connection 60 similar to the passage 36. This device is also provided with a connection 61 which extends to a master cylinder and the connection 62 to a brake line.

A valve similar to the valve 13 is provided in the upper cylinder 58 and a stem 63 thereof extends to a packing gland 64 and a lever 65, similar to the lever 14, is provided on the outer end. This device is also provided with a pressure responsive element 66 similar to the element 16 and connections 67 and 68 extend to a pilot light positioned at a remote point.

The instrument or safety device of this invention may be connected in line to each brake of a motor vehicle or one unit may be used for the entire vehicle or a unit may be used for the brakes of the front wheels and another unit for the brakes of the rear wheels, as may be desired. It will also be understood that these units may be incorporated in fluid pressure lines for operating hydraulically actuated equipment, such as punch presses and other machines and tools used in industrial plants, and may also be used on airplanes, railway trains and other devices.

In using the device after repairing the leak or break in a line the lever 14 is first turned to open the valve 13 so that brake fluid may flow from the master cylinder through the by-pass to fill the lines and the foot lever is then pressed building up pressure in the lines whereby air pockets and moisture in the lines are bled through the bleeder valves on the brakes. With the pressure held on the lines the valve 13 is then opened again with the foot lever pressed so that all air, water and the like are forced from the line and upon release of the foot pedal the valve 13 is again closed and the foot lever pressed to insure the operator that the line is completely filled with brake, or other fluid. The line is then ready for use.

As illustrated in Figure 1 the master cylinder 22 is connected by the tube 69 to connecting pipes 70 and 71 of the brakes of the rear wheels and the units 10 are connected to the rear wheel brakes through connections 72 and 73.

A connection 74 also extends from the master cylinder to the connections 32 and 75 of the front wheels the connections extended from the units 10.

Each of the units is provided with a pressure plug 16 which is connected by suitable wires to the pilot light 19 whereby with pressure in the units the circuit is completed to the pilot light associated therewith and when the pressure is relieved by a leak or break in a line the movement of the piston 11 to the opposite end of the cylinder relieves the pressure and breaks the circuit to the pilot light. By this means the operator of a vehicle or machine is instantly advised that a leak or break has developed in a line.

It will be understood that with the device of this invention, should a leak or break develop in one or more of the lines to the brakes, this device seals the leaky or broken lines so that with even one line, or a line to a single brake, intact you still have a full brake.

It will be understood that other modifications may be made in the design and arrangement of the parts without departing from the spirit of the invention.

What is claimed is:

1. In a hydraulic brake system, a body provided with a chamber, a piston reciprocably mounted in said chamber, an annular flange extending from said piston, there being a passageway in said body adapted to be connected to a source of brake fluid under pressure, said body being provided with a restricted opening for establishing communication between said passageway and chamber, there being a conduit in said body communicating with said passageway, said body having a by-pass communicating with said conduit, a coil spring positioned in said by-pass, said by-pass terminating in an enlarged recess, a valve casing seated in said recess and provided with a pair of diametrically opposed openings, a valve rotatably seated in said valve casing and provided with an interior bore for communicating with said by-pass, there being a port in said valve communicating with said bore and mounted for movement into and out of registry with the openings in said valve casing, said coil spring abutting said valve, there being a passage in said body leading from one of the openings in said valve casing to said chamber, a nut for closing one end of said chamber, a tube extending from said nut and adapted to be connected to a wheel brake, and a head on said piston mounted for movement into and out of closing relation with respect to said restricted opening.

2. The apparatus as described in claim 1, wherein said conduit is arranged at right angles with respect to said passageway and said by-pass has its longitudinal axis arranged parallel to the longitudinal axis of said chamber.

References Cited in the file of this patent

UNITED STATES PATENTS

| Number | Name | Date |
|---|---|---|
| 1,578,824 | Herbst et al. | Mar. 30, 1926 |
| 1,905,077 | Walker | Apr. 25, 1933 |
| 2,093,015 | Madden | Sept. 14, 1937 |
| 2,097,889 | Miller | Nov. 2, 1937 |
| 2,219,765 | Chase | Oct. 29, 1940 |
| 2,245,682 | Kerr | June 17, 1941 |
| 2,332,301 | Cox | Oct. 19, 1943 |
| 2,353,304 | Green | July 11, 1944 |